US009785531B2

(12) United States Patent
Astigarraga et al.

(10) Patent No.: US 9,785,531 B2
(45) Date of Patent: *Oct. 10, 2017

(54) LINK SPEED DOWNSHIFTING FOR ERROR DETERMINATION AND PERFORMANCE ENHANCEMENTS

(71) Applicant: INTERNATIONAL BUSINESS MACHINES CORPORATION, Armonk, NY (US)

(72) Inventors: Tara Astigarraga, Fairport, NY (US); Christopher V. Derobertis, Hopewell Junction, NY (US); Louie A. Dickens, Tucson, AZ (US); Michael E. Starling, Honesdale, PA (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,456

(22) Filed: Mar. 21, 2016

(65) Prior Publication Data

US 2016/0203039 A1 Jul. 14, 2016

Related U.S. Application Data

(63) Continuation of application No. 14/279,006, filed on May 15, 2014, now Pat. No. 9,298,579.

(51) Int. Cl.
*G06F 11/30* (2006.01)
*G06F 11/26* (2006.01)
*G06F 11/07* (2006.01)
*H04L 12/825* (2013.01)
(Continued)

(52) U.S. Cl.
CPC .......... *G06F 11/3065* (2013.01); *G06F 11/07* (2013.01); *G06F 11/076* (2013.01); *G06F 11/079* (2013.01); *G06F 11/0745* (2013.01); *G06F 11/0772* (2013.01); *G06F 11/0778* (2013.01); *G06F 11/0787* (2013.01); *G06F 11/0793* (2013.01); *G06F 11/26* (2013.01); *H04B 10/0795* (2013.01);
(Continued)

(58) Field of Classification Search
CPC ............................. G06F 11/3065; G06F 11/26
See application file for complete search history.

(56) References Cited

U.S. PATENT DOCUMENTS 4,047,151 A * 9/1977 Rydbeck ................. H04L 1/004
375/243
4,890,316 A * 12/1989 Walsh ..................... H04M 11/06
370/282
(Continued)

*Primary Examiner* — Joseph D Torres
(74) *Attorney, Agent, or Firm* — Griffiths & Seaton PLLC

(57) ABSTRACT

Various embodiments for regulating link speed for performance enhancement and port diagnosis are provided. In response to identifying an amount of errors in a communications link above a predetermined threshold, an applicable transmission speed is selectively reduced. If errors identified at the reduced transmission speed are found to decrease, a communications port incorporating the communications link is flagged as potentially dirty, and if the errors identified at the reduced transmission speed are found to remain constant, the communications port is flagged as potentially bad.

24 Claims, 4 Drawing Sheets

(51) Int. Cl.
   *H04L 1/00* (2006.01)
   *H04B 10/079* (2013.01)
(52) U.S. Cl.
   CPC ......... *H04B 10/07953* (2013.01); *H04L 1/00* (2013.01); *H04L 1/0002* (2013.01); *H04L 47/25* (2013.01)

(56) References Cited

U.S. PATENT DOCUMENTS

| | | | | |
|---|---|---|---|---|
| 5,617,430 A * | 4/1997 | Angelotti | G01R 31/041 | 702/117 |
| 5,691,991 A * | 11/1997 | Kessler | G01R 31/04 | 714/25 |
| 5,819,025 A * | 10/1998 | Williams | G01R 31/31855 | 714/30 |
| 6,618,360 B1 * | 9/2003 | Scoville | H04L 12/2697 | 370/248 |
| 8,184,677 B1 | 5/2012 | McRobert et al. | | |
| 8,458,527 B2 * | 6/2013 | Oldfield | G06F 11/00 | 714/43 |
| 2006/0092465 A1 * | 5/2006 | Hong | H04N 1/33323 | 358/1.15 |
| 2006/0282705 A1 * | 12/2006 | Lopez | G01R 31/31717 | 714/27 |
| 2007/0192505 A1 | 8/2007 | Dalmia | | |
| 2009/0240790 A1 * | 9/2009 | Utsunomiya | H04L 12/4645 | 709/221 |
| 2010/0188097 A1 * | 7/2010 | Sul | G01R 31/31717 | 324/537 |
| 2011/0191637 A1 * | 8/2011 | Wight | G06F 11/00 | 714/43 |
| 2011/0191644 A1 * | 8/2011 | Oldfield | H04B 1/38 | 714/704 |
| 2012/0072772 A1 * | 3/2012 | Whitt | G06F 11/079 | 714/32 |
| 2013/0007333 A1 * | 1/2013 | Fai | G06F 13/4086 | 710/313 |
| 2013/0007562 A1 * | 1/2013 | Fai | G06F 11/1004 | 714/758 |
| 2013/0282891 A1 * | 10/2013 | Davis | G06F 11/0709 | 709/224 |
| 2014/0379898 A1 * | 12/2014 | Schmit | H04L 41/0856 | 709/224 |
| 2015/0178173 A1 * | 6/2015 | Brodsky | G06F 11/2289 | 710/16 |
| 2015/0333866 A1 * | 11/2015 | Astigarraga | H04L 1/0002 | 714/708 |

* cited by examiner

LINK SPEED DOWNSHIFTING FOR ERROR DETERMINATION AND PERFORMANCE ENHANCEMENTS

CROSS-REFERENCE TO RELATED APPLICATIONS

This application is a Continuation of U.S. patent application Ser. No. 14/279,006, filed on May 15, 2014.

BACKGROUND OF THE INVENTION

Field of the Invention

The present invention relates in general computing systems, and more particularly to, various embodiments for performance enhancement and error diagnosis in data networks.

Description of the Related Art

Today with modern technology, large volumes of data are storable on disk and flash drives; these drives can exist as a solo entity, or as part of a broader make up within a larger storage environment. As the sheer volume of data in today's information-based society continues to increase, so too does the demands placed on legacy infrastructures such as Fibre Channel and Gigabit Ethernet cabling and other data communications mechanisms.

SUMMARY OF THE INVENTION

High speed optical-fibre cabling, such as Fibre Channel, Fibre Channel over Ethernet, Infiniband, SCSI, iSCSI, Ethernet, and Gigabit Ethernet cabling, has always recommended special handling and cleaning procedures but in the past, such cabling was often robust enough to withstand higher levels or dirt, dust particles and mistreatment. The same relaxed policies that existed in many client and development/test labs across the industry for years are starting to cause larger scale problems at higher fibre channel speeds. As networking speeds increase, the tolerance for dust, cable bends, kinks and other optical variants is much smaller. Currently one of the top causes of intermittent link issues is cabling and Small Form-Factor Pluggables (SFPs), often related to improper maintenance, cleaning or cabling knots.

A wide variety of resources collectively advise customers to take more proactive measures and increase cleaning schedules at higher speeds, but there is nothing currently to help diagnose these problems and handle them in a live customer environment scale. Current technologies include specialized tools to be placed on one link at a time to physically inspect optics for dust particles and other variants, particularly at the exposed ends of the optical-fibre cables. Higher link speeds are more and more sensitive to optical signal strength degradation. Consequently there is a continuing and increasing need for advanced detection and handling capabilities built into data transfer products to help alleviate the related stress and errors seen in complex customer environments.

Accordingly and in view of the foregoing, to address the challenges previously described, various embodiments for regulating link speed for performance enhancement and port diagnosis are provided. In one such embodiment, by way of example only, a method for regulating link speed for performance enhancement and port diagnosis are provided. In response to identifying an amount of errors in a communications link above a predetermined threshold, an applicable transmission speed is selectively reduced. If errors identified at the reduced transmission speed are found to decrease, a communications port incorporating the communications link is flagged as potentially dirty, and if the errors identified at the reduced transmission speed are found to remain constant, the communications port is flagged as potentially bad.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, such communications mechanisms as optical-fibre channel cabling have always recommended special handling and cleaning procedures. However, in the past, these communications mechanisms were often robust enough to withstand higher levels or dirt, dust particles and mistreatment. The same relaxed policies that existed in many client and development/test labs across the industry for years are starting to cause larger scale problems at higher fibre channel and especially Gigabit Ethernet speeds, for example. As networking speeds increase, the tolerance for dust, cable bends, kinks and other optical variants is much smaller. Currently one of the top causes of intermittent link issues is cabling and Small Form-Factor Pluggables (SFPs), often related to improper maintenance, cleaning, or cabling knots.

A wide variety of resources collectively advise customers to take more proactive measures and increase cleaning schedules at higher speeds, but there is nothing currently to help diagnose these problems and handle them in a live customer environment scale. Current technologies include specialized tools to be placed on one link at a time to physically inspect optics for dust particles and other variants. Higher link speeds are more and more sensitive to optical signal strength degradation. Consequently there is a continuing and increasing need for advanced detection and handling capabilities built into data transfer products to help alleviate the related stress and errors seen in complex customer environments.

Accordingly, and in view of the foregoing, to address the challenges previously described, various embodiments for regulating link speed for performance enhancement and port diagnosis are provided. In one such embodiment, by way of example only, a method for regulating link speed for performance enhancement and port diagnosis are provided. In response to identifying an amount of errors in a communications link above a predetermined threshold, selectively an applicable transmission speed is selectively reduced. The selective reduction occurs upon one of a temporary, permanent, and user-defined basis, and the selective reduction is performed using one of a manual setting adjustment and speed negotiation logic applied to the communications link. If errors identified at the reduced transmission speed are found to decrease, a communications port incorporating the communications link is flagged as potentially dirty, and if the errors identified at the reduced transmission speed are found to remain constant, the communications port is flagged as potentially bad.

Figure 1:
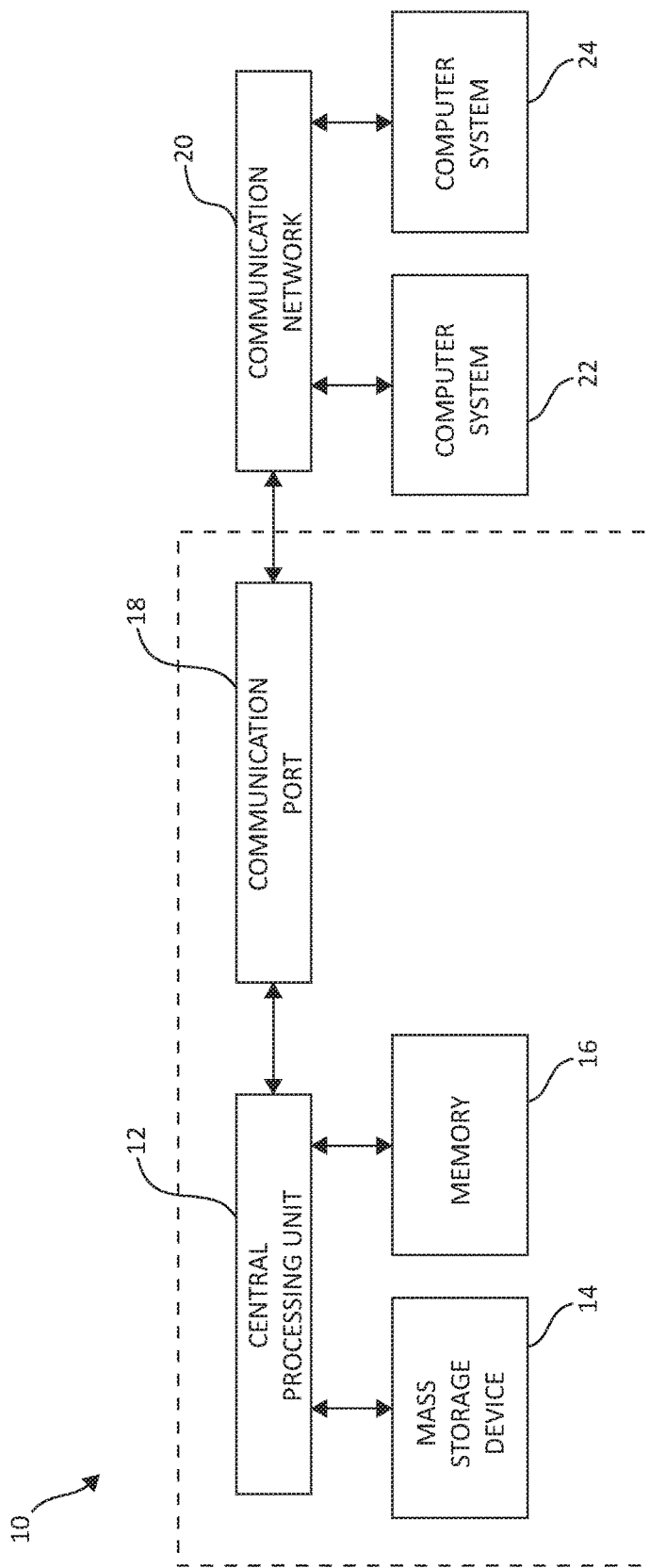
FIG. 1 is an exemplary block diagram showing a hardware structure for performing link speed regulation functionality, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 22 and 24 and storage systems, which may include storage devices 14. The storage systems may include hard disk drive (HDD) devices, solid-state devices (SSD), optical disk drives, flash storage, etc., which may be configured in a redundant array of independent disks (RAID). The communication port 18, communication network 20, and other components not pictured for the sake of brevity but known to the skilled artisan may include such hardware components as Fibre Channel, Fibre Channel over Ethernet, Infiniband, SCSI, iSCSI, Ethernet, and/or Gigabit Ethernet cabling, corresponding Fibre Channel, Fibre Channel over Ethernet, Infiniband, SCSI, iSCSI, Ethernet, and/or Gigabit Ethernet ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22 and 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

In light of the observation that in general, the higher the communications link speeds, the higher the sensitivity to signal degradation, the mechanisms of the illustrated embodiments introduce a proactive self-diagnostic link process and link integrity coping methodology as will be further described. At a high level and in one embodiment, this methodology may be described as the following. If the applicable link speed is, for example, 8 Gb (Gigabits/second) or higher (e.g., 10 Gb, 16 Gb, 32 Gb, 40 Gb, etc. etc.), and the associated communications link is found to experience intermittent errors, the following steps may be performed.

First, again in an exemplary embodiment, the rate of errors is logged for a period of time (e.g., x minutes) at the current link speed. Second, the speed layer is reduced one degree (e.g., one layer) (n−1), and the applicable rate is again monitored for another period of time (e.g., another x minutes). Third, if the rate of failure was reduced at the lower speed (factoring in Input/Output Operations Per Second (TOPS)), then log the occurrence of the reduced failure at the lower speed.

Fourth, return to the original speed and monitor, and if the errors again return, flag the applicable communications port as a potential "dirty link." If errors are found to continue at the same magnitude at the n−1 layer speed, flag the applicable communications port as potentially "bad".

Those links that are identified as failing and/or dirty may, as one of ordinary skill in the art, be repaired, cleaned, and maintained as the case may be. In repairing a failed communication link, such tasks may be involved as (1) replacing the SFPs because the optical interfaces could also be scratched or dirty, (2) replacing the cable between the SFPs, or (3) both.

The ability for data center administrators to diagnose which components are failing and which are dirty represents a significant advancement, and would also help to streamline the maintenance process. Further, a history table of components that were flagged as dirty and/or bad may, in one embodiment, be maintained, and if the same components continually manifested themselves on the list, flags could be set and administrators notified so the components could be removed from the environment. This list could also be used to help determine cleaning schedules and other related activities.

Additional logic could be added such that is a failure occurs off-hours (or policy based logic) that if n−1 speed was more stable the port could continue to operate at that speed until a maintenance window can occur or the system administrator is able to replace the component.

An additional aspect of the illustrated embodiments may be seen by vested security or lab owners seeking to understand the types of errors and themes that are occurring to try and identify intentional or accidental insider threats to the overall network environment. For example, when a certain threshold of "dirty ports" per month is met, or some percentage of event types occur over a defined period of time, an alert could be sent to an administrator, security officer, or another person of authority so that the administrator, security officer, or other person of authority is aware of the problems and can change policies or procedures accordingly to help protect the environment from these errors in the future. For example, perhaps an employee isn't periodically cleaning critical components or perhaps the errors spike after a recent cleaning due to improper cleaning procedures, or perhaps a disgruntled employee is bending cables. The potential causes for errors is essentially infinite; however by adding the identification capabilities of the mechanisms of the illustrated embodiments, handling and notification capabilities can help to improve the environment going forward.

For example, in a related embodiment, environmental sensors may be implemented in similar fashion to the error counters previously described, such that when the environmental sensors are at or below a certain "contamination" tolerance of the recommended handling/cleaning procedures and/or requirements, and a vested parties policies threshold has been exceeded, that an early warning alert may be triggered to indicate potentially covert or malicious activity against the systems infrastructure. In other words, this embodiment may help to identify activity patterns that are not expected/found under normal and proper maintenance and environmental conditions.

Figure 2:
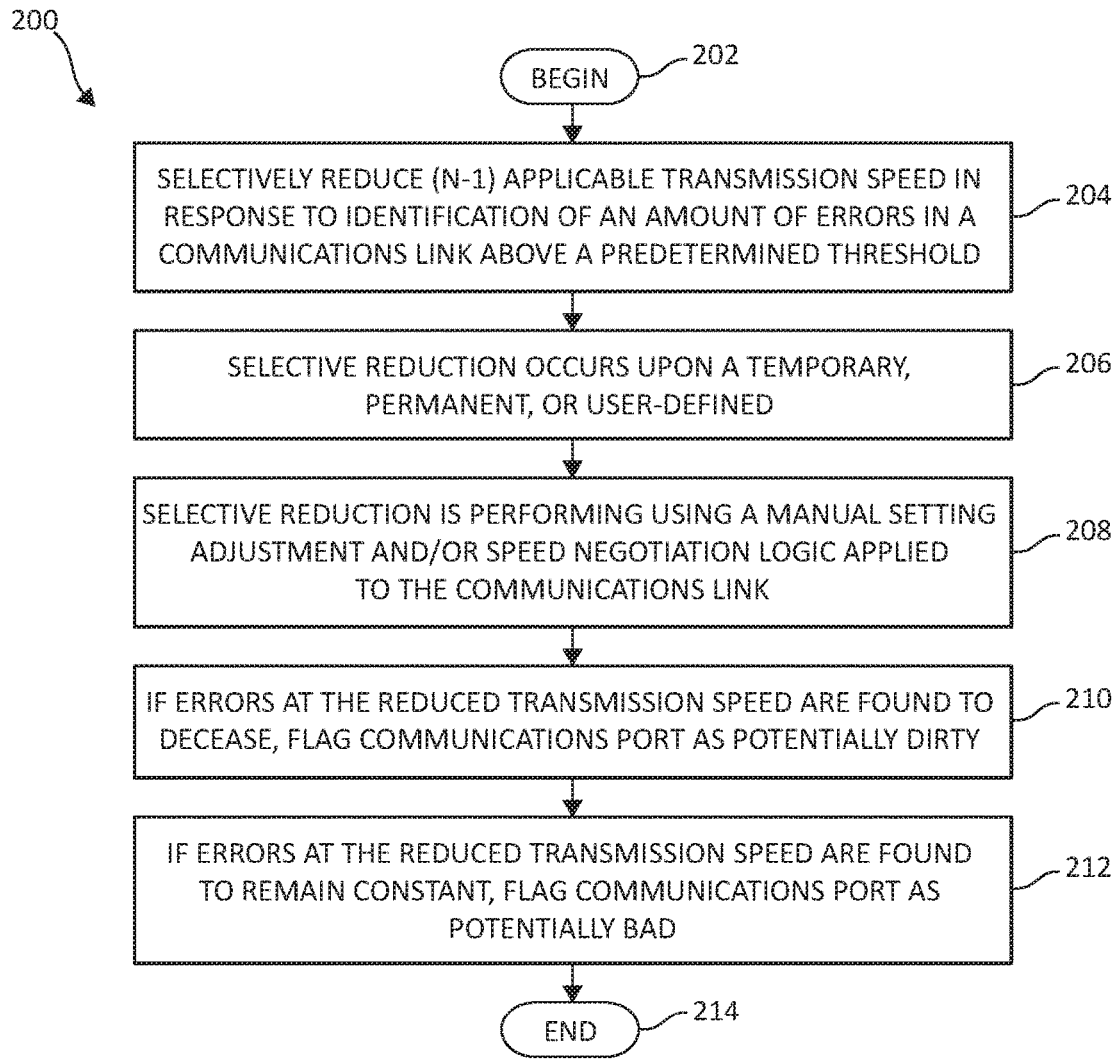
FIG. 2 is a flow chart diagram illustrating an exemplary method for link speed regulation, again in which aspects of the present invention may be realized.

Turning now to FIG. 2, a flow chart diagram of exemplary functionality for implementing link regulation according to various aspects of the present invention is shown by method 200. Method 200 begins (step 202) by selectively reducing (i.e. reduction of speed from its current speed "n" to the next lower speed "n−1") of an applicable transmission speed in response to an identification of an amount of errors in a communications link above a predetermined threshold (step 204). The selective reduction occurs on a temporary, permanent, or user-defined basis (step 206). The selective reduction is performed using a manual setting adjustment and/or speed negotiation logic applied to the communications link (step 208). If errors at the reduced transmission speed are found, the communications port is flagged as potentially dirty (step 210), and if errors at the reduced transmission speed are found to remain approximately constant, the communications port is flagged as potentially bad (step 212). The method 200 then ends (step 214).

Figure 3A:
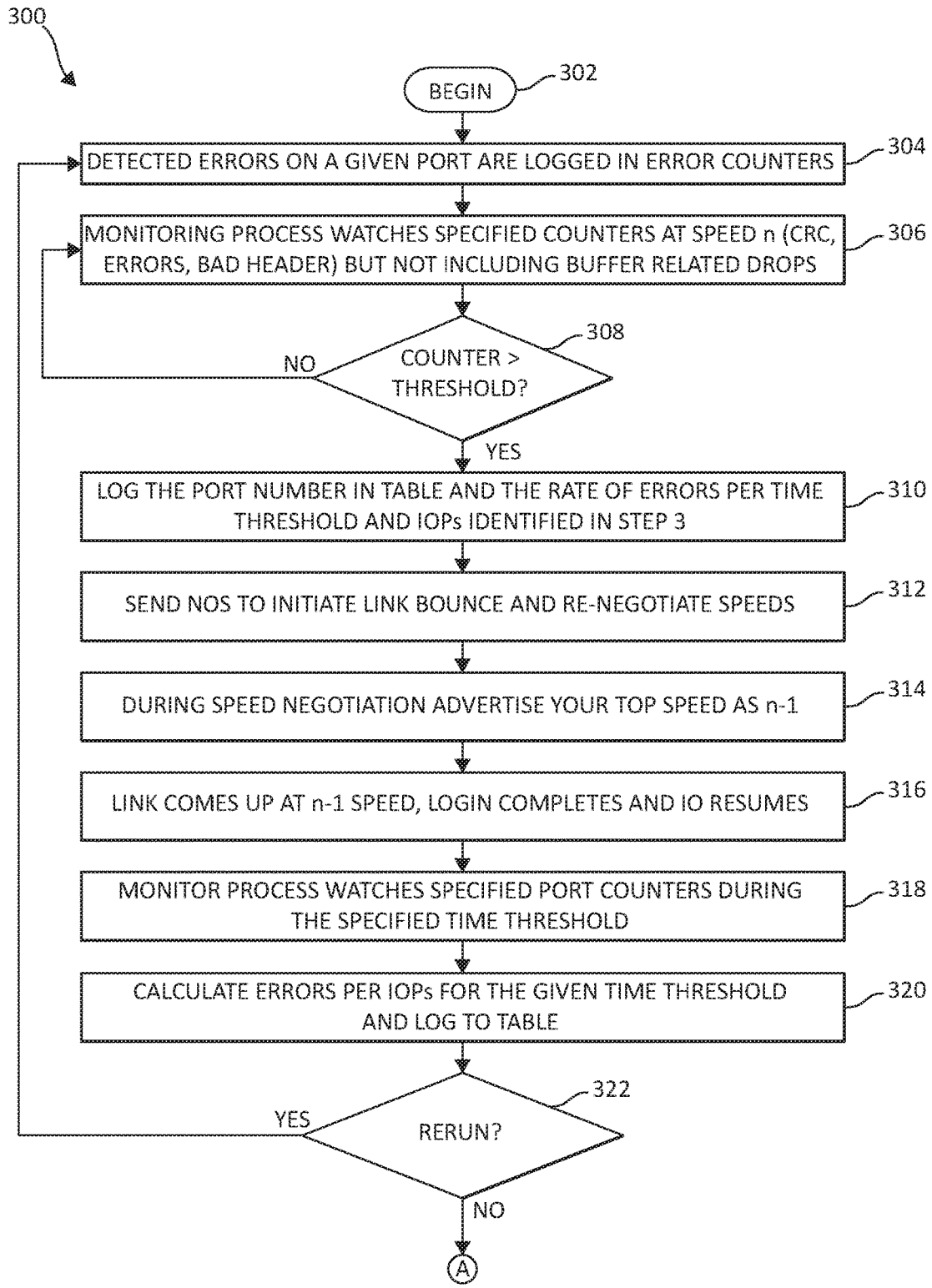
FIG. 3A is an additional flow chart diagram illustrating an additional exemplary method for effecting link speed regulation, again in which aspects of the present invention may be implemented.

Turning now to FIG. 3A, a flow chart illustration of an exemplary method for effecting link regulation in accordance with various aspects of the illustrated embodiments, is depicted as method 300. Method 300 begins (step 302) with the detection of errors on a given communication port that are logged into error counters (step 304) by use of a monitoring process. During the course of the monitoring activity, specified counters are observed at an applicable link speed "n," such as Error Correction Code (ECC) errors, Cyclic Redundancy Check (CRC) errors, Frame Check Sequence (FCS) errors, bad header errors, and the like, but not including buffer-related drops (step 306). Here again, a variety of errors may be detected, including the environmentally related errors discoverable by environmental sensors previously described.

Moving to step 308, if a given counter goes over the specified threshold in the specified time, the method 300 moves to step 310; otherwise the method 300 returns to step 306 to continue the monitoring and observation practices.

If, as previously stated, the specified threshold is exceeded (again, step 308), the applicable port number is logged, for example in a table, including the rate of errors per time threshold and IOPs identified previously (step 310). As a following step (step 312), a Network Online/Offline Sequence (NOS) is sent to initiate a link bounce operation and renegotiate speeds over the communication link (step 312).

During the speed negotiation process in step 312, the mechanisms of the illustrated embodiments may advertise the applicable new top speed as "n−1" (i.e., the communication link speed has been reduced to a new, generally lower speed) (step 314). The communication of this new top speed to network components informs the components and allows the components to adjust data processing and transfer activities in view of the new top speed.

As a next step (step 316), the link comes up at the new applicable n−1 speed. The login completes, and I/O then resumes. The monitoring process previously described then observes specified port counters during the specified time threshold (step 318). Errors per IOPs are then calculated for this specified time threshold, and logged (here again, for example to the table previously mentioned) (step 320).

As an optional step in the illustrated exemplary method 300, the steps 304-320 indicated may be rerun, or a subset of these steps 304-320 may be rerun to ensure that the results obtained are repeatable (step 322).

Figure 3B:
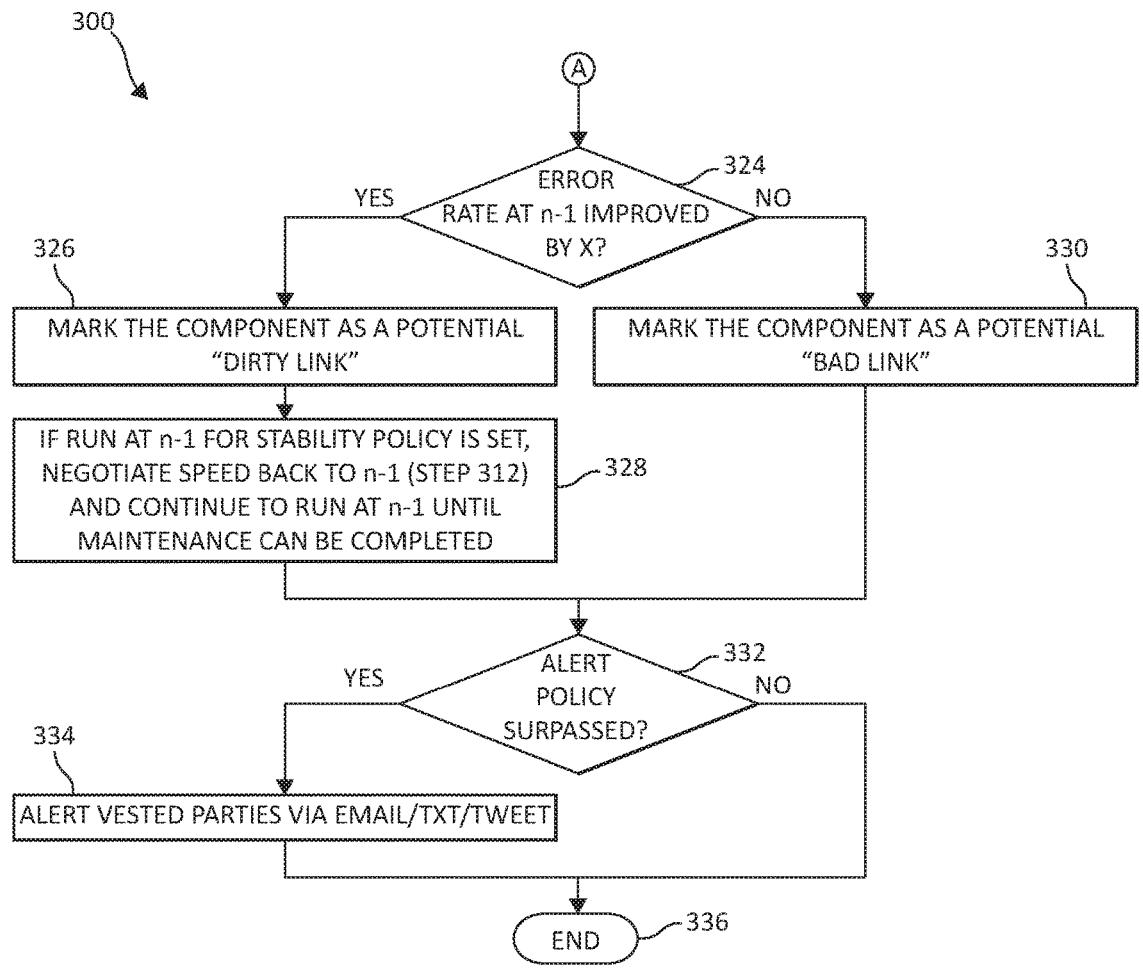
FIG. 3B is an additional flow chart diagram illustrating a continuation of the exemplary method for effecting link speed regulation first shown in FIG. 3A previously, here again in which aspects of the present invention may be implemented.

Turning now to FIG. 3B, exemplary method 300 continues from FIG. 3A shown previously. In decision step 324, the method queries whether the calculated error rate/ratio at the n−1 speed improved by a programmable threshold (e.g., "x"). If the error rate is observed to remain constant (i.e., not improved) at the n−1 speed, the network component or components in question using the link may be suspect. Accordingly, the applicable component is marked/flagged as a potential "bad link" (step 330).

Returning to step 324, if the error rate is observed to improve (i.e. reduce) at the n−1 speed, then the network component or components in question using the link may alternatively be suspected to be "dirty," rather than "bad," and the component is marked/flagged as a potentially dirty link (step 326).

Continuing from step 326, if the component or components were marked as a "dirty link" and a run at n−1 speed for stability policy is set in the network, the applicable speed is renegotiated back to n−1 as in step 312 previously, and the system continues to run at the n−1 speed until applicable maintenance or further checks are undertaken by administrators, etc. (step 328).

Continuing to step 332, if an alert vested parties policy is set, the applicable log(s) is checked to determine if the alert threshold per given policy has been surpassed. If so, the vested part(ies) are alerted via any means available (e.g., email, text, tweet) (step 334). The method 300 then ends (step 336).

While the mechanisms of the illustrated embodiments have been said to selectively reduce the applicable transmission speed as a consequence of error identification, these mechanisms may also be tailored, in a further embodiment, such that the applicable transmission speed, upon the determination of one or more predetermined criterion, is selectively reduced a greater amount (i.e., to a n−2 rather than n−1 speed). For example, identified errors may be of a large enough magnitude that a greater speed reduction may be warranted. One of ordinary skill in the art will appreciate that the reduction in applicable link speed may vary significantly depending on a particular situation. In addition, the manner in which the changes in link speed are implemented may also significantly vary.

It should be noted that while the mechanisms of the illustrated embodiments have applicability in the high-speed cabling scenarios described above, these mechanisms also may be applied to other legacy communications links/cabling, such as copper cabling. One of ordinary skill in the art will appreciate that the mechanisms may be tailored to suit a wide variety of implementations across a broad swath of communications technologies and protocols.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for regulating link speed for performance enhancement and port diagnosis by a processor device, comprising:

in response to identifying an amount of errors in a communications link above a predetermined threshold, selectively reducing (n−1) an applicable transmission speed; and if errors identified at the reduced transmission speed are found to decrease, flagging a communications port incorporating the communications link as potentially dirty, and if the errors identified at the reduced transmission speed are found to remain constant, flagging the communications port as potentially bad.

2. The method of claim 1, wherein:
the selective reduction occurs upon one of a temporary, permanent, and user-defined basis;
the selective reduction is performed using one of a manual setting adjustment and speed negotiation logic applied to the communications link; and
selective reducing the applicable transmission speed further includes, upon a determination of at least one criterion, forgoing the reduction of the applicable link speed to n−1 and instead implementing a further, n−2, transmission speed reduction.

3. The method of claim 1, wherein selectively reducing the applicable transmission speed further includes sending a Network Online/Offline Sequence (NOS) to initiate a link bounce and re-negotiate the transmission speed over the communications link.

4. The method of claim 1, wherein selectively reducing the applicable transmission speed further includes advertising a top speed as the reduced, n−1 speed.

5. The method of claim 1, further including performing at least one of:
logging errors in the communications link in at least one error counter,
returning the applicable transmission speed to a prior (n) state,
identifying errors above the predetermined threshold,
selectively reducing the applicable transmission speed, and
flagging the communications port as one of potentially dirty and potentially bad.

6. The method of claim 1, wherein if the communications port is flagged as potentially dirty, continuing to operate at the reduced, n−1 speed until a maintenance operation is performed on at least one of the communications link and the communications port.

7. The method of claim 1, further including alerting a vested party per an alert vested parties policy.

8. The method of claim 7, wherein:
identifying the amount of errors includes identifying an environmental error in which at least one environmental sensor is found at or below a contamination tolerance of a recommended handling procedure; and
if a threshold for the alert vested parties policy is exceeded, an alert is provided to an administrator to indicate malicious activity against infrastructure incorporating the communications link.

9. A system for regulating link speed for performance enhancement and port diagnosis, comprising:
a communications link;
a communications port connected to the communications link; and
a processor device in operable control over the communications port and communications link, wherein the processor device, in response to identifying an amount of errors in the communications link above a predetermined threshold, selectively reduces (n−1) an applicable transmission speed, and
if errors identified at the reduced transmission speed are found to decrease, flags the communications port as potentially dirty, and if the errors identified at the reduced transmission speed are found to remain constant, flags the communications port as potentially bad.

10. The system of claim 9, wherein:
the selective reduction occurs upon one of a temporary, permanent, and user-defined basis,
the selective reduction is performed using one of a manual setting adjustment and speed negotiation logic applied to the communications link, and
the processor device, pursuant to selective reducing the applicable transmission speed, upon a determination of at least one criterion, forgoes the reduction of the applicable link speed to n−1 and instead implements a further, n−2, transmission speed reduction.

11. The system of claim 9, wherein the processor device, pursuant to selectively reducing the applicable transmission speed, sends a Network Online/Offline Sequence (NOS) to initiate a link bounce and re-negotiate the transmission speed over the communications link.

12. The system of claim 9, wherein the processor device selectively reduces the applicable transmission speed further includes advertising a top speed as the reduced, n−1 speed.

13. The system of claim 9, wherein the processor device performs at least one of:
logging errors in the communications link in at least one error counter,
returning the applicable transmission speed to a prior (n) state,
identifying errors above the predetermined threshold,
selectively reducing the applicable transmission speed, and
flagging the communications port as one of potentially dirty and potentially bad.

14. The system of claim 9, wherein if the communications port is flagged as potentially dirty, the processor device continues to operate at the reduced, n−1 speed until a maintenance operation is performed on at least one of the communications link and the communications port.

15. The system of claim 9, wherein the processor device alerts a vested party per an alert vested parties policy.

16. The system of claim 15, further including at least one environmental sensor associated with the communication link, and wherein:
identifying the amount of errors includes identifying an environmental error in which the at least one environmental sensor is found at or below a contamination tolerance of a recommended handling procedure; and
if a threshold for the alert vested parties policy is exceeded, an alert is provided to an administrator to indicate malicious activity against infrastructure incorporating the communications link.

17. A computer program product for regulating link speed for performance enhancement and port diagnosis by a processor device, the computer program product comprising a no-transitory computer-readable storage medium having computer-readable program code portions stored therein, the computer-readable program code portions comprising:
an executable portion that, in response to identifying an amount of errors in a communications link above a predetermined threshold, selectively reduces (n−1) an applicable transmission speed; and
an executable portion that, if errors identified at the reduced transmission speed are found to decrease, flags a communications port incorporating the communications link as potentially dirty, and if the errors identified at the reduced transmission speed are found to remain constant, flags the communications port as potentially bad.

18. The computer program product of claim 17, wherein:
the selective reduction occurs upon one of a temporary, permanent, and user-defined basis;

the selective reduction is performed using one of a manual setting adjustment and speed negotiation logic applied to the communications link; and further including an executable portion that, pursuant to selectively reducing the applicable transmission speed, upon a determination of at least one criterion, forgoes the reduction of the applicable link speed to n−1 and instead implements a further, n−2, transmission speed reduction.

19. The computer program product of claim 17, further including an executable portion that, pursuant to selectively reducing the applicable transmission speed, sends a Network Online/Offline Sequence (NOS) to initiate a link bounce and re-negotiate the transmission speed over the communications link.

20. The computer program product of claim 17, further including an executable portion that, pursuant to reducing the applicable transmission speed, advertises a top speed as the reduced, n−1 speed.

21. The computer program product of claim 17, further including an executable portion that performs at least one of:
    logging errors in the communications link in at least one error counter,
    returning the applicable transmission speed to a prior (n) state,
    identifying errors above the predetermined threshold,
    selectively reducing the applicable transmission speed, and
    flagging the communications port as one of potentially dirty and potentially bad.

22. The computer program product of claim 17, further including an executable portion that, if the communications port is flagged as potentially dirty, continues to operate at the reduced, n−1 speed until a maintenance operation is performed on at least one of the communications link and the communications port.

23. The computer program product of claim 17, further including an executable portion that alerts a vested party per an alert vested parties policy.

24. The computer program product of claim 17, further including an executable portion that:
    pursuant to identifying the amount of errors, identifies an environmental error in which at least one environmental sensor is found at or below a contamination tolerance of a recommended handling procedure; and
    if a threshold for the alert vested parties policy is exceeded, provides an alert to an administrator to indicate malicious activity against infrastructure incorporating the communications link.

\* \* \* \* \*